July 25, 1944. W. R. DAND ET AL 2,354,201
SHOCK ABSORBER FOR FLUID FLOW INSTALLATION
Filed April 13, 1942 2 Sheets-Sheet 2
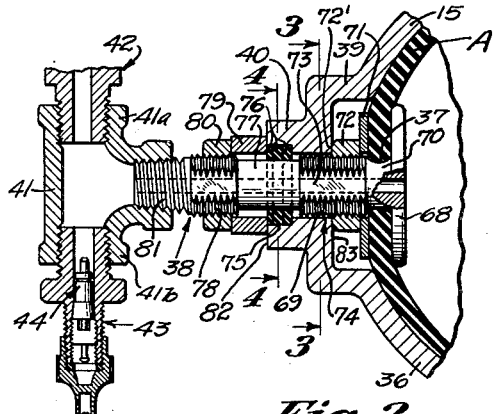
Fig. 2.
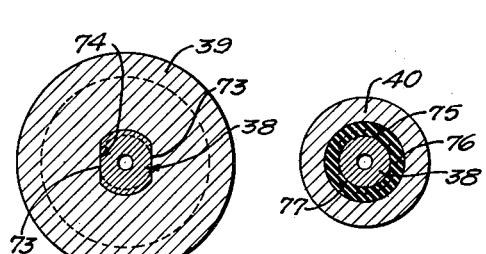
Fig. 3. Fig. 4.
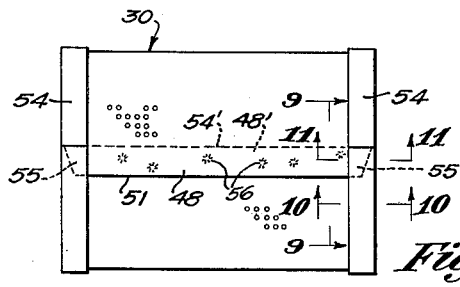
Fig. 7.
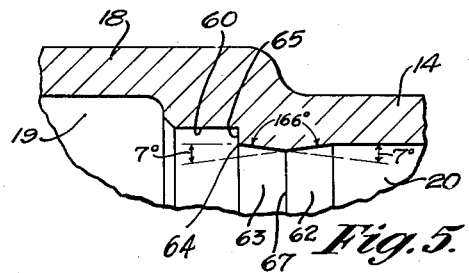
Fig. 5.
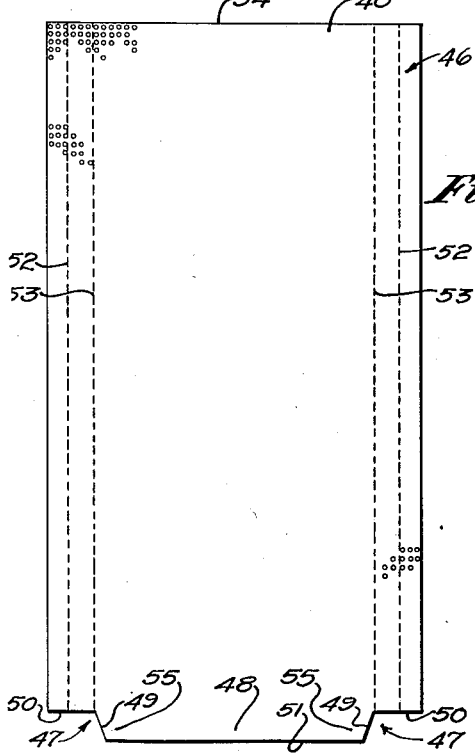
Fig. 8.
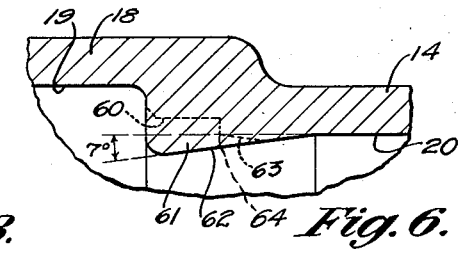
Fig. 6.
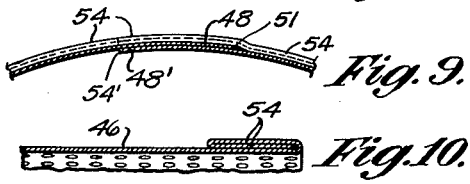
Fig. 9.
Fig. 10.
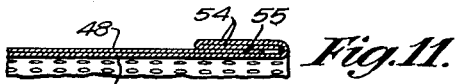
Fig. 11.
Inventors
William R. Dand,
William E. Steen.
Barhelew + Scanthleting
Attorneys.

Patented July 25, 1944

2,354,201

UNITED STATES PATENT OFFICE 2,354,201

SHOCK ABSORBER FOR FLUID FLOW INSTALLATIONS

William R. Dand, Altadena, and William E. Steen, Pasadena, Calif., assignors to Smith Meter Company, Los Angeles, Calif., a corporation of California Application April 13, 1942, Serial No. 438,788

3 Claims. (Cl. 138—30)

This invention has to do with shock absorbers for fluid flow installations and is more particularly concerned with absorbers of the type employing an expansible, cylindrical sack adapted to absorb the shock incident to surges or sudden shut-offs in flowing fluids.

The device is of use in any situation where it is desirable or necessary to protect valves, fittings, pumps, meters, etc., against the acknowledged harmful effects of fluid hammer or shock, as well as to accommodate volumetric increases in the fluid which may occur due to temperature changes.

The device is also of the type wherein the cushioning or shock absorbing body of air is positively separated from the flowing fluid, the possibility of entraining the air in the flowing fluid thus being eliminated.

The general objects of the invention are to provide a device which, though of relatively small bulk and light weight, has great shock absorbing efficiency and is capable of responding adequately throughout a wide range of operating conditions; and to maintain this efficiency and capacity over a long period of time even though the operating conditions be extremely severe.

It is a further object to provide a device which may be assembled or disassembled with ease and dispatch and in which there is presented little opportunity for undue wear or for failure, in spite of the fact that certain elements are exposed to conditions which, except for our novel provisions, would bring about early wear or failure.

Other objects and features of the invention will be made apparent from the following detailed description, reference being had to the accompanying drawings, in which:

Fig. 1a is a reduced section on line 1a—1a of Fig. 1;

Fig. 2 is an enlarged fragmentary section of a portion of the device appearing at the left end of Fig. 1;

Fig. 3 is a section on line 3—3 of Fig. 2;

Fig. 4 is a section on line 4—4 of Fig. 2;

Fig. 5 is an enlarged fragmentary section of the details enclosed within the area indicated at 5 in Fig. 1, the screen and pneumatic tube being omitted;

Fig. 6 is a section generally similar to Fig. 5 but showing the appearance of this portion of the device prior to certain machining steps;

Fig. 7 is a detached elevation of a cylindrical screen making up a part of the device;

Fig. 8 is a plan view of the screen blank prior to being fabricated into the form of Fig. 7;

Fig. 9 is an enlarged detail section on line 9—9 of Fig. 7;

Fig. 10 is an enlarged fragmentary section on line 10—10 of Fig. 7; and

Fig. 11 is an enlarged fragmentary section on line 11—11 of Fig. 7.

Figure 1:
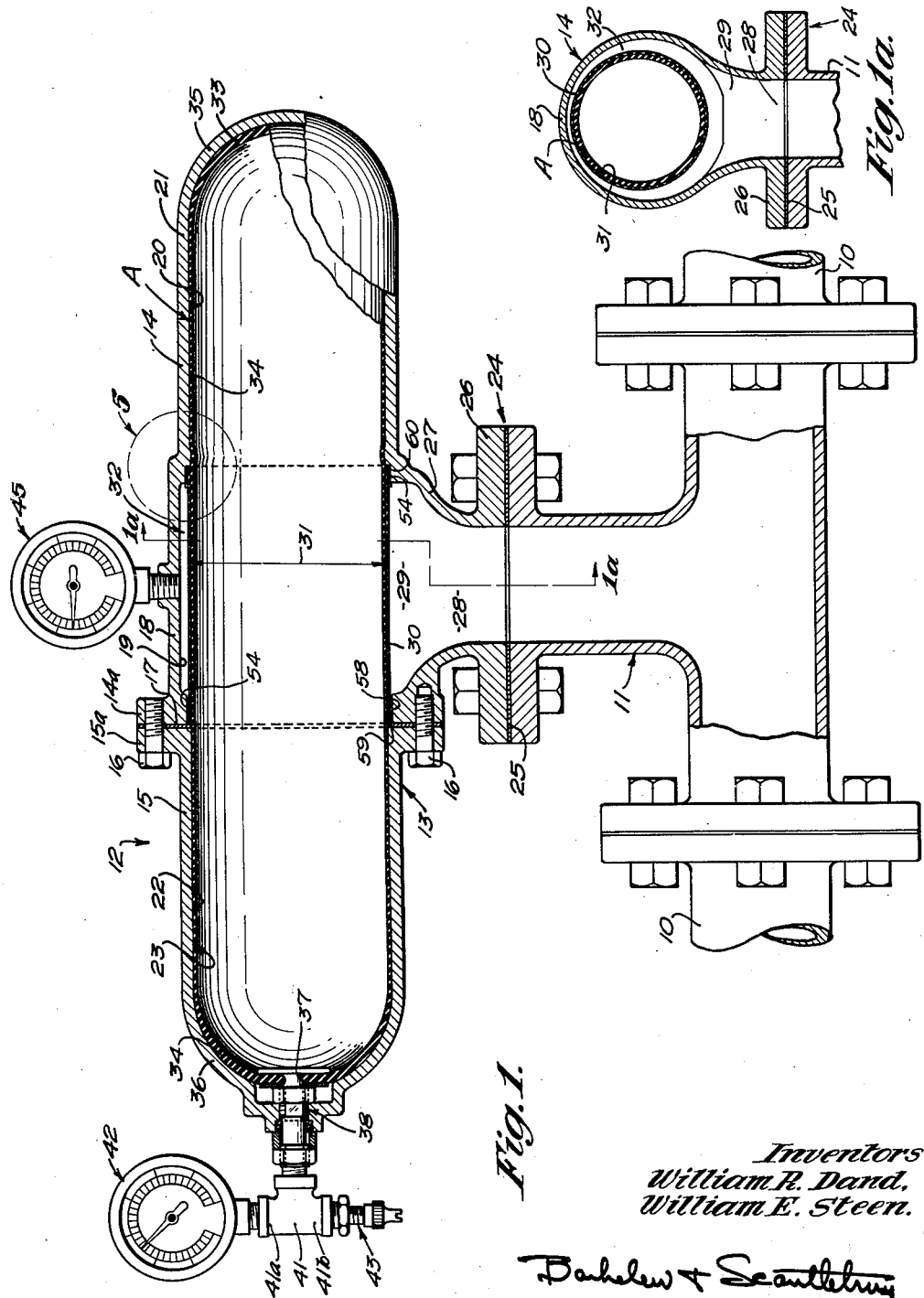
Fig. 1 is a longitudinal axial section, partly in broken away elevation, showing an embodiment of our invention.

Flow line 10 is connected by flanged T 11 to the shock absorber which is generally indicated at 12.

Absorber 12 includes a sectional housing 13 of generally cylindrical shape but with its ends rounded, section 14, which may be considered the body section, and section 15, which may be considered the cap section, being adapted to be disconnectably attached to one another by bolts 16 extending through flanges 14a and 15a. To form a fluid tight joint between the sections, an oil resistant gasket 17, made of "neoprene" or the like, is compressed between the flanges.

The flanged end of housing section 14 has a portion 18 which is of greater outside diameter than is the closed-end portion of that section, the bore 19 of portion 18 likewise being greater than is the bore 20 of the closed-end portion 21. The bore 22 of cap section 15 is of approximately the same diameter as bore 20, and the three bores 19, 20 and 22 are in substantial axial alinement and may be considered as making up the main bore or expansion chamber 23 of the shock absorber.

The connection of T 11 to absorber 12, or, for that matter, of flow line 10 to absorber 12, may be any suitable standard type of fitting, but we have here shown a bolted flange connection 24 gasketed at 25, wherein flange 26 is integral with neck 27, the latter, in turn, being integral with housing section 14. Neck bore 28 widens at 29 to open into and to be longitudinally co-extensive with enlarged bore 19. Removably mounted within section 14 and spanning bore 19 and neck bore 29, is screen 30 of which more will be said later. It may be remarked at this point, however, that the bore 31 of the screen is of substantially the same diameter as the bores 20 and 22.

It will be seen by reference to Fig. 1a that section portion 18 and screen 30 define an approximately annular chamber 32 which opens to neck bore 28 through spread opening 29.

Extending through bores 20, 22 and 31 is a pneumatic tube A which is in the form of an elongated cylindrical sack with rounded ends 33 and 34, the ends preferably being of greater thickness than the longitudinally extending wall 34, and being substantially complementary in shape to the rounded ends 35 and 36 of sections 14 and 15, respectively. Tube A is made of a resilient material such as rubber, or, in the event it is to be exposed to oils or gases, of a resilient material which is oil or gas resistant. For instance, where the absorber is used in connection with petroleum flow lines, the tube may be made of "neoprene."

Tube A has an end aperture 37 to receive hollow stem 38 which extends through hollow bosses 39 and 40 (Fig. 2) of housing end 36. The particularities of the stem, its connection of the tube, and its mounting in the housing will be described later. At this point it will suffice to say that the stem is connected to T 41 whose branches 41a and 41b mount, respectively, pressure gauge 42 and capped and valved inlet 43. Inlet 43 may carry any suitable check valve 44 such as a conventional "Schraeder" valve, whereby the air pressure within tube A may be built up or varied to meet varying operating conditions, gauge 42 giving visual indication of the pressure existing within the tube.

Gauge 45 may be connected to annular chamber 32, thus being adapted to give visual indication of the pressure within flow line 10. The operator, by noting the pressure indicated on gauge 45, may vary the pressure within tube A until gauge 42 shows that the internal pressure has the proper value relative to the external pressure as will give the results which have been found best to suit the indicated external pressure. Then, by varying the internal pressure of the tube, one may vary the resistance of the tube to collapsing pressure by the flow line fluid, and thus regulate the shock absorbing characteristics of the tube best to meet any given flow line condition.

It will be evident that any "hammer" or shock caused by a sudden interruption in the flow of fluid through line 10 will be impressed upon and absorbed, at least in the major part, by the air filled flexible tube A; the fittings, piping, and any apparatus in circuit with the flow line thus being relieved of such shock. Likewise, if there be volumetric increase in the fluid of the flow line during non-flow periods, such as may occur due to a rise in temperature, the additional volume is accommodated by compression of tube A.

The screen 30 circumferentially supports tube A where it spans bore 19 and opening 29, preventing bursting or central deformation of the tube at times when the internal pressure is greater than the external pressure and also serving uniformly to distribute the liquid pressure during instances of surge or shock. The screen perforations permit, of course, the external fluid pressure to be imposed directly on the exterior of tube A. As will be pointed out, the screen may be readily removed to permit cleaning of its perforations, since the latter may become clogged with pipe scale or the like.

Due to the inherent nature of tube A, it is obvious that the walls against which the tube may lie should be as smooth as possible to prevent undue tube-wear, for during periods of operation the housing and tube must, through certain co-extensive zones, have relative movement. The screen, of course, forms one such wall and both it and its mounting with the housing must be such as to preserve the specified smoothness. To this end we have fashioned and mounted screen 30 in the particular manner illustrated and now to be described. As the screen is to be supported solely at its ends, it is preferable that said ends be annularly reenforced, and we have provided a particularly efficient type of reenforcement which not only contributes to the simplicity of manufacture, but also insures the preservation of the smoothness qualities spoken of above.

The screen 30 (Fig. 7) is made up of a perforated blank 46 (Fig. 8) the edge 48' of the blank being cut through unperforated areas so no jagged ends, such as would exist were the cuts to be made from perforation to perforation, are presented. Edge 48' is the only single-thickness edge which, when the screen is finally fabricated, is presented at the inside of the screen. The blank is perforated uniformly throughout, though, for sake of simplicity, in Figs. 7 and 8 only a few of the perforations are shown.

One end of blank 46 is notched at 47 to provide a tab 48, preferably having converging side edges 49. At each side of tab 48 will be an end shoulder 50 which is parallel to tab end 51. The blank is first folded and crimped along lines 52 and then refolded along lines 53 to give the double folds 54 (Fig. 10) which double folds 54 ultimately become the external reenforcing rings of the screen (Fig. 7). However, the last folding is not finally crimped down until the blank is rolled into the cylindrical form of Fig. 7. Tab 48 is brought into overlapping relation with end 54' of blank 46 (Fig. 9) and the corners 55 of the tab are slipped between the body of the blank and the ends of folds 54 (Figs. 7 and 11). The folds are then tightly and smoothly crimped down to retain the tab corners against subsequent displacement. Tab 48 is pressed smoothly against the underlying body portion of the screen and soldered thereto or it may be spot-welded at points 56 to prevent subsequent separation. From this point on, folds 54 will be considered as external reenforcing rings.

This method of fabrication gives a screen which is light in weight and yet amply reenforced at its points of end support, and one which presents a sufficiently smooth interior surface to insure that the tube will not be torn or abraded during periods of operation.

The screen bore 31 is, as has been said, of the same internal diameter as bore 22 and is to be axially aligned therewith so there may be no projecting edges at the junction of the screen ends and the housing. To secure and preserve this alinement, housing section 14 is bored true at 58 to take one of the rings 54, the spotting of the holes for flange bolts 16 being such that it is assured, upon assembly, that bore 58 is coaxial with bore 22. Gasket 17 has the same inside diameter as screen 30 and bore 22, thus giving a flush juncture between the bores of housing section 15, gasket 17, and screen bore 31. Gasket 17 presents an annulus 59 which overlies the end of the associated ring 54.

The annular seat 60 (Fig. 5) for the other end of screen 30 is bored true with respect to bore 58 and in axial alinement therewith. Seat 60 is of a diameter to accommodate the over-all thickness of the screen and ring 54. A fabrication problem is involved at this point, for, as said above, the entire bore taking the tube A must be as smooth as possible and, at least, must have no sharp projections. It will be appreciated that while seat 60 may be turned so that it will be in true axial alinement with bore 58, there is little likelihood that seat 60 will be exactly axially alined with bore 20 of housing casting 21, unless bore 20 be fully machined—which is to be avoided if possible. With seat 60 and bore 20 out of axial alinement there would be resulting eccentricity which would, in effect, throw projecting, 90° shoulders into the bore (one shoulder presented by a portion of the end of the screen and the other presented by the diametrically opposite point of the housing). Such projection would tend rapidly to wear or abrade tube A. To avoid this effect, housing section 14 is cast with an extra mass of material 61 at the general point of juncture of bores 19 and 20 (Fig. 6). The bore 62 of this built-up zone, is conical, tapering inwardly toward the open end of the housing section. We have found that an approximately 7° inclination with respect to the longitudinal axis of the housing is suitable for the purpose. After cutting annular face 60 to a depth to take ring 54 and with the casting chucked up as it was in cutting that face, a tapering cut at an angle of approximately 7°, but with the taper running in a direction opposite to that of taper 62, is taken at 63. The cut of face 63 will be of a depth such that its point of junction 64 with the 90° shoulder 65 formed when cutting seat 60, will be flush with the inner peripheral face of the screen. The inclined face 63 will, of course, be in axial alinement with the seat 60 and bore 58. Thus, there will be no such eccentricity at the junction between the end of the screen and the housing section as would project shoulders into the tube-taking bore. On the other hand, the included angle between faces 62 and 63 is so great (approximately 166° when the cuts are of the taper indicated above) that the annular projection 67 defined by these faces is relatively blunt and will not represent a hazard to the tube.

The screen 30 is of such length that, when the housing sections are bolted together at 16, the screen will be clamped between gasket annulus 59 and shoulder 65, the screen thus being held against both rotation and longitudinal movement with respect to the housing section. On the other hand, the screen may be readily removed for cleaning or replacement by merely disconnecting the housing sections.

We will now turn to the tube connection and mounting. It is obviously important that the connection between tube stem 38 and housing section 15 be fluid tight so there may be no escape of flow line fluid from the absorber. It is also important that the tube be held from the rotation within the housing, both for reasons of assembly and for reasons of precaution against relative displacement of a harmful nature during operation of the device. The arrangement we have devised fully insures that such will be the case.

Hollow stem 38 has a flat head 68 (Fig. 2) and a threaded portion 69 at opposite sides of neck 70. This neck is taken within aperture 37 and the tube is tightly clamped between heads 68 and washer 71, the latter being forced into clamping engagement with the tube by nut 72 threaded on portion 69. Portion 69 is flatted at 73 (Figs. 2 and 3) to fit a complementarily flatted aperture 74 in housing boss 39. Aperture 74 is axially alined with cylindrical counterbore 75 (Fig. 2 and 4) in housing boss 40, the counterbore 75 being adapted to take a plurality of compressible washers 76 which fit about the reduced-diameter portion 77 of stem 38. Washers 76 are preferably made of oil resistant material, such as "neoprene." At the other end of reduced diameter portion 77, is a threaded portion 78 adapted to support one end of the relatively thick packing washer 79 and to hold that washer centered with respect to the stem in spite of the fact that the major portion of the washer is annularly cleared from the reduced diameter portion 77. Threaded portion 78 also takes nut 80, while extending beyond the threaded portion, the stem is provided with a pipe thread 81 to take T 41.

With stem 38 clamped to tube A by washer 71 and head 68, the tube and stem are assembled with cap 15 by thrusting the stem, stripped of all elements except washer 71 and nut 72, through flatted aperture 74 and counterbore 75 from the inside of the cap. Washers 76 are then slipped over the stem and into counterbore 75, the several washers being of such aggregate thickness that the outer face of the outermost washer extends beyond cap face 82. Washer 79 and nut 80 are then applied to the stem, the nut being turned up to draw face 72' of nut 72 (which face may be considered to represent a shoulder on the stem) against cap face 83 and the inner face of washer 79 against cap face 82, the washer assembly being longitudinally compressed and radially spread in a manner to make up a fluid tight joint between the stem and the housing.

During this assembly operation, the flats 73 and 74 cooperate to hold stem 38 and hence tube A against rotation, so the nut 80 may be threaded fully home without otherwise gripping the stem. Likewise, nut 80 may be tightened up during subsequent operation of the device, if the parts have become accidentally loosened, without having to take the housing apart or without having to remove any of the fittings from the stem, since the cooperating flats will hold the stem against rotation during the tightening operation without otherwise gripping the stem.

With this method of supporting the stem and of clamping the tube and assembly to the end wall of housing cap 15, the tube and stem are not only held against rotation with relation to the housing but also against longitudinal movement with relation thereto.

With tube A and its stem thus assembled with cap section 15 and with screen 30 inserted properly within housing section 14, the free end of the tube is slid through the screen bore into bore 20, the housing sections flanges are brought against opposite sides of washer 17, and bolts 16 are taken up to connect the two housing sections in fluid-tight association. T 41 and its gauge 42 and valved inlet 43 are then coupled as shown, and the device is ready for operation.

It will be seen the structure and assembly is such that minimum wear is imposed upon the tube and there is presented minimum opportunity for failure of any kind during service operations. Should occasion arise for repair or replacement of parts, or for the cleaning of foreign matter from the screen, it will be seen the device may be quickly and easily disassembled to allow for such operations.

While we have shown and described a preferred embodiment of our invention, it will be understood that various changes in design, structure and arrangement may be made without departing from the spirit and scope of the appended claims.

We claim:

1. In a device of the character described, a housing having a substantially cylindrical bore, a pneumatic tube within the housing bore, a hollow inlet stem carried by the tube and projecting through one wall of the housing to the exterior thereof, the bore of the housing having a portion with enlarged inside diameter, there being a flow line inlet opening radially to the enlarged portion of the housing bore, a cylindrical screen extending across said portion but annularly spaced from the inner face thereof, said tube extending through the screen bore, the inside diameter of the screen being substantially equal to the diameter of the bore of the housing at opposite sides of the enlarged portion, said screen having its ends folded over to provide external reenforcing rings, and said rings being circumferentially seated in the housing at opposite sides of said enlarged bore portion and holding the screen axially alined with the housing bore.

2. In a device of the character described, a housing, a pneumatic tube within the housing, a hollow inlet stem carried by the tube and projecting through one wall of the housing to the exterior thereof, the bore of the housing having a portion with enlarged inside diameter through which the tube extends and which is adapted to communicate with a flow line, a cylindrical screen extending across said portion but annularly spaced from the inner face thereof, said tube extending through the screen bore, axially alined, annular seats in the housing at opposite ends of the enlarged bore portion, the ends of the screen being adapted to be taken, one each, in said seats, one of said seats being end-defined by an annular shoulder, there being a tapered bore portion in the housing and concentric with said one annular seat and tapering inwardly from said shoulder, and there being another tapered bore portion in the housing tapering in a direction opposite that of the first mentioned tapered portion and starting at the smaller terminus of said first mentioned tapered portion.

3. In a device of the character described, a housing, a pneumatic tube within the housing, a hollow inlet stem carried by the tube and projecting through one wall of the housing to the exterior thereof, the bore of the housing having a portion with enlarged inside diameter through which the tube extends and which is adapted to communicate with a flow line, a cylindrical screen extending across said portion but annularly spaced from the inner face thereof, said tube extending through the screen bore, axially alined, annular seats in the housing at opposite ends of the enlarged bore portion, the ends of the screen being adapted to be taken one, each, in said seats, one of said seats being end-defined by an annular shoulder, there being a tapered bore portion in the housing and concentric with said one annular seat and tapering inwardly from said shoulder, and there being another tapered bore portion in the housing tapering in a direction opposite that of the first mentioned tapered portion and starting at the smaller terminus of said first mentioned tapered portion, the defining walls of the two tapered portions defining between them a blunt projection extending into the housing bore.

WILLIAM R. DAND.
WILLIAM E. STEEN.